Oct. 3, 1939.  J. B. SHERMAN  2,175,001
MEASURING SYSTEM
Filed Nov. 9, 1937  3 Sheets-Sheet 1

INVENTOR.
JESSE B. SHERMAN
BY
ATTORNEY.

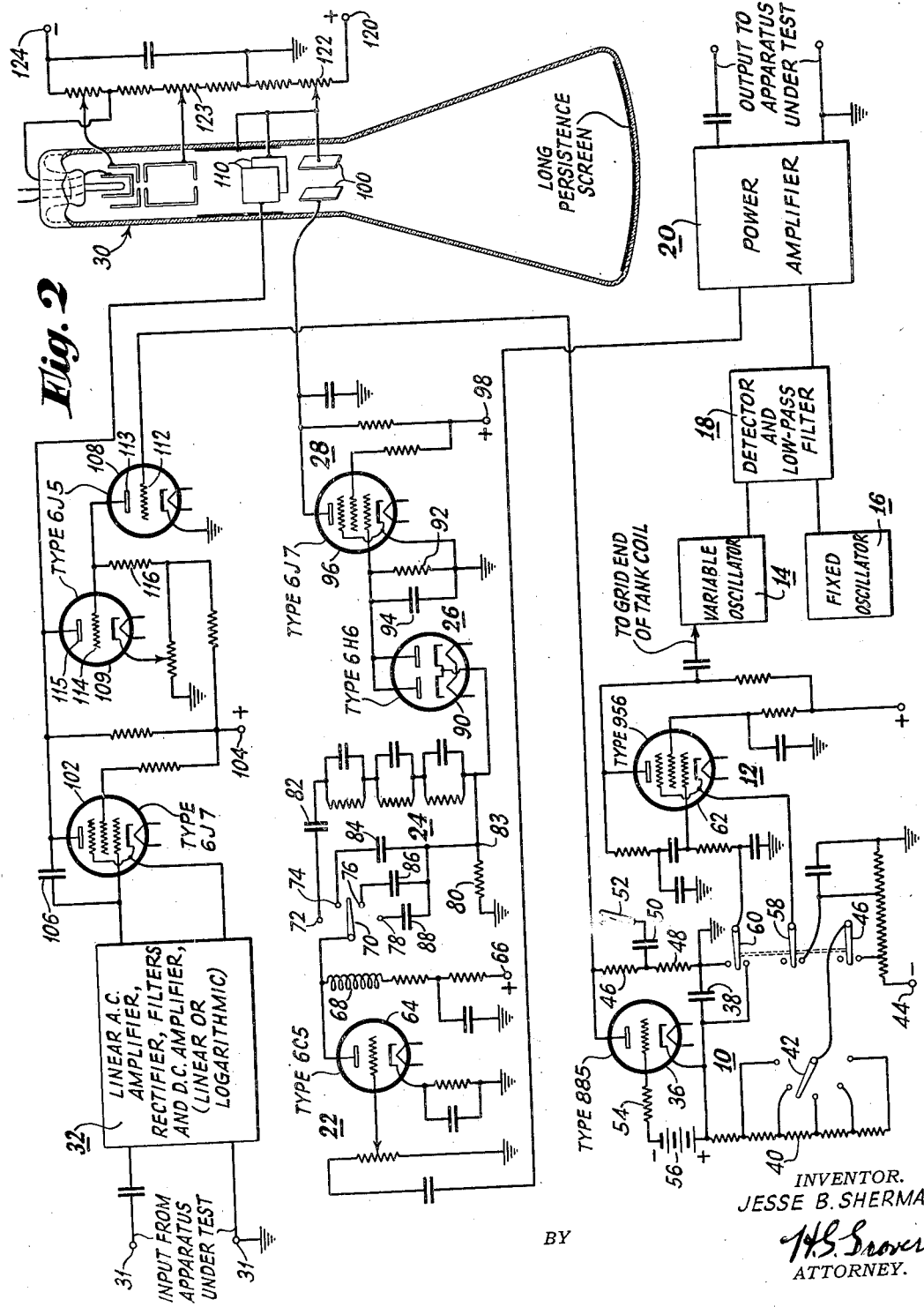

Patented Oct. 3, 1939

2,175,001

UNITED STATES PATENT OFFICE 2,175,001

MEASURING SYSTEM

Jesse B. Sherman, New York, N. Y., assignor to Radio Corporation of America, a corporation of Delaware Application November 9, 1937, Serial No. 173,570

11 Claims. (Cl. 179—175.1)

This invention relates to measuring systems and more particularly to the method of and means for rapidly determining the frequency response characteristics of electrical networks, as well as vibratory or oscillatory mechanical systems.

It is sometimes desirable or necessary in the study of mechanical and electrical vibratory systems and frequency response systems to know the relationship between the response amplitude of one or more of the parameters of the system as a function of the frequency of the driving force applied thereto and to show this relationship visually in graphic form with the ordinate values representing the amplitude of response and the abscissae representing the values of the applied frequency. In measuring systems which have previously been used the apparatus for and method of obtaining such characteristics were either quite complicated and required more or less elaborate set-ups of an extensive nature, or were relatively simple and required separate and individual tests for each point on the curve.

The point-by-point method which has been used in the preparation of frequency response characteristics of frequency responsive systems is not entirely satisfactory inasmuch as a great number of points must be plotted particularly where the apparatus varies rapidly in response with respect to the applied frequency. In an acoustic device which responds to an applied frequency, such as a loud speaker, for instance, the apparatus inherently displays rapid rates of change with respect to the applied frequency and as a result, to produce an accurate curve representing the frequency response characteristics of the device the number of points required becomes prohibitive for practical work.

The present invention, therefore, more specifically relates to a system whereby the frequency response characteristics of a frequency responsive system or device may be determined and presented in the form of a curve or graph through the use of a cathode ray tube which is provided with a fluorescent or viewing screen, the characteristic curve of the particular apparatus in question being displayed on the viewing end of a cathode ray tube. The present invention is a continuation in part of application Serial No. 161,795 of Jesse B. Sherman, filed August 31, 1937.

In the present invention wherein it is possible to display the characteristics of a frequency response apparatus on the viewing screen of a cathode ray tube, it is desirable that the abscissae, which represent the applied frequency, vary logarithmically in order that more accurate determinations of the frequency response characteristics may be had in the lower frequencies. The horizontal movement of the beam in the cathode ray tube is repeatedly deflected automatically by reason of a relaxation generator and its action on a beat frequency generator, the beat frequency generator including a variable oscillator and a fixed oscillator. In some instances, however, it is desirable to expand portions of the abscissae with respect to frequency in order that the frequency response characteristics of the apparatus in question may be more fully ascertained and examined within a particular desired range of frequencies.

It is also desirable in a system such as that shown and described to render the vertical deflection of the cathode ray beam ineffective during the time that the cathode ray beam is horizontally returned across the screen prior to the presentation of a subsequent characteristic curve. It is also desirable in such a system to provide means whereby the cathode ray beam and the variable oscillator may be stopped at a particular point in the cycle of operation in order that adjustments may be made to properly position the curve produced on the field of the viewing screen of the cathode ray tube and in order that the usual zero adjustment to the variable oscillator of the beat frequency generator may be made.

It is therefore one purpose of the present invention to provide means whereby the frequency response characteristics of a frequency responsive system or device may be ascertained, and whereby a curve of this characteristic be presented on the viewing screen of a cathode ray tube.

It is a further purpose of the present invention to provide means whereby the abscissae of the produced curve will represent the applied frequency, the abscissae varying according to a logarithmic function of the applied frequencies.

It is still another purpose of the present invention to provide means whereby various portions of the abscissae may be expanded with respect to frequency in order that the frequency response characteristics of the device in question may be more fully and more accurately determined over the particular expanded portion of the curve.

A further purpose of the present invention resides in the provision of means whereby the frequency response of the particular apparatus under test, that is, the ordinate values of the characteristic curve, may be applied to the vertical deflecting plates of a cathode ray tube, with still further means whereby the degree of vertical deflection may vary linearly or logarithmically with respect to the frequency response.

It is still another purpose of the present invention to provide means whereby the vertical deflection of the cathode ray beam, which represents the frequency response of the particular apparatus, be made ineffective during those periods when the cathode ray beam is returned to the initial starting point prior to the production of a subsequent characteristic curve.

It is still another purpose of the present invention to provide means whereby the movement of the cathode ray beam may be entirely stopped in order to facilitate the zero setting of the beam whereby the curve on the viewing screen of the cathode ray tube may be properly positioned and in order that the usual zero adjustment to the variable oscillator of the beat frequency generator may be made.

Still another purpose of the present invention resides in the provision of means whereby all alternating current components of the current or voltage derived from the particular apparatus in question may be eliminated in order that the voltages which are ultimately applied to the vertical deflection plates may be free from any superimposed alternating currents and whereby these voltages will vary directly or logarithmically in proportion to the frequency response of the particular apparatus in question.

It is another purpose of the present invention to provide means whereby the movement of the cathode ray beam across the viewing screen will be uniform with respect to time, yet will move logarithmically with respect to the applied frequency.

Other purposes and advantages of the present invention will become more apparent to those skilled in the art by a reading of the following more detailed description, particularly when considered in connection with the drawings wherein corresponding parts are represented by corresponding reference characters, and wherein:

Figure 2 shows a system constructed in accordance with the present invention.

Figure 1:
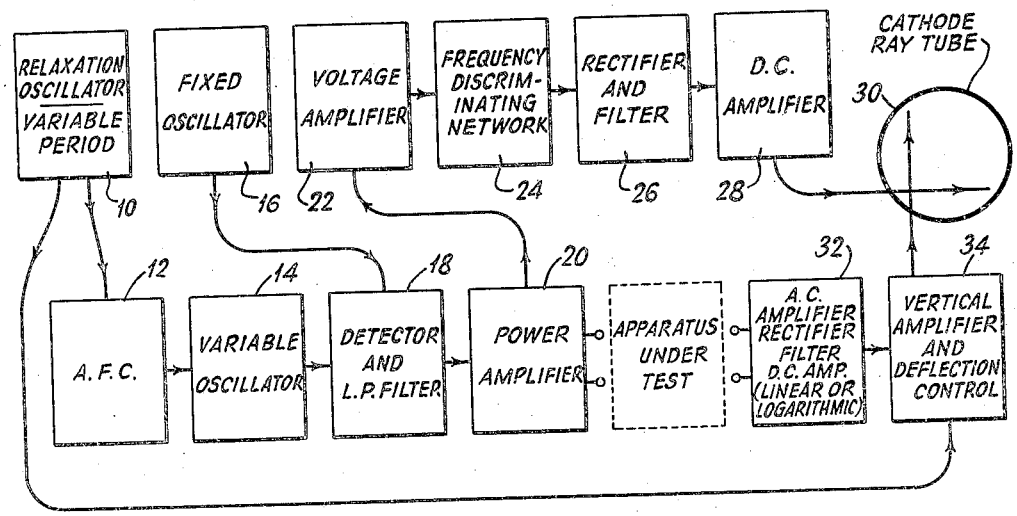
Figure 1 represents a block diagram of the apparatus used in the present invention.

The present invention is shown schematically in the block diagram of Figure 1 and represents the elements which are used to produce a system in accordance with the present invention. A relaxation oscillator 10 is provided which may be adjustable in order that the periodicity of the oscillations may be controlled. The range of the periodicity is preferably chosen, for example, to lie within the limits of 10 seconds and one minute. This apparatus determines the length of time required for the cathode ray beam to produce the frequency response characteristic curve of the particular apparatus tested. The output from the relaxation oscillator is supplied to an automatic frequency control system 12, which controls a variable oscillator 14 which, together with a fixed oscillator 16, supplies a beat frequency which varies from 20 to 15,000 cycles per second, for example. These frequencies are detected and are subjected to a low-pass filter 18 and the resulting cyclically varying oscillations are applied to a power amplifier 20 which in turn supplies the cyclically varying frequencies to the particular apparatus under test.

The cyclically varying frequencies which are derived from the detector and low-pass filter 18 are also applied to a voltage amplifier 22 and the output from this amplifier is fed to a frequency discriminating network 24 for the purpose of producing the desired potentials for horizontally deflecting the cathode ray beam. This frequency discriminating network includes a series of parallel resistances and condensers for the purpose of causing the beam to be deflected logarithmically with respect to the applied frequency. The frequency discriminating network also includes means whereby various frequency bands may be expanded, the bands being selectable at will by the operation of a selector switch. The output from the frequency discriminating network is applied to a rectifier and filter system 26, which in turn supplies energy to a direct current amplifier 28, the output of which is connected to the horizontal deflecting plates of the cathode ray tube 30.

The energy from the particular apparatus under test is applied to a system which comprises an alternating current amplifier, a rectifier, a filter network and a direct current amplifier, all of which are represented by the rectangle 32. This portion of the system is provided with means whereby a linear or logarithmic response may be produced in order that the vertical deflections on the screen of the cathode ray tube may vary in direct proportion to the output of the device tested or may vary logarithmically with respect to the output of the device. The output from this system is supplied to a vertical amplifier and deflection control system 34. This system is also supplied with impulses from the relaxing oscillator 10 and includes means whereby the vertical amplifier is made ineffective during the periods when the cathode ray beam is horizontally returned to the initial starting point. The output of this system is applied to the vertical deflecting plates of the cathode ray tube 30.

Figure 2 shows the actual circuits used in portions of the entire system. The remaining portions which are old and well known in the art are shown in block diagram in order that the complete system may be materially simplified.

The relaxing oscillator employs a tube 36 which is a gas discharge tube and which may be, for example, a type 885 gas discharge triode. A condenser 38 which is of relatively large capacity is provided, one terminal of which is grounded and the other terminal of which is connected to one end of tapped resistor 40. The various taps along the resistor 40 may be selectively connected to a switch arm 42 which in turn is connected to a negative source of voltage 44 when the switch arm 46 is in the lower or "automatic" position. This provides a charging circuit for the condenser 38, the rate of charge being determined by the amount of the resistance 40 which is included in series therewith. The cathode or electron emitter element of the tube 36 is connected to a point between the condenser 38 and a resistance 40 and the anode of the tube 36 is connected to ground by way of a relatively high resistance 46 and a relatively low resistance 48. Connected in parallel with the resistance 46 is a relatively small condenser 50 and a control switch 52, the purpose of which will be explained more fully later. The control electrode of the tube 36 is connected to the electron emitter element by way of a resistance 54 and a source of voltage 56 in order that a proper bias may be maintained on the control electrode. Switch arms 58 and 60 are operated in conjunction with the switch arm 46 and when all of the switch arms are in the lower position the relaxation oscillator operates automatically, whereas, when the switch arms are all in the upper position manual operation of the oscillator may be accomplished.

The relaxation oscillator 10 produces a sawtooth voltage the frequency of which is determined by the amount of resistance 40 which is included in series with the condenser 38 and which is determined by the position of the switch arm 42. The condenser 38 charges according to an exponential characteristic and when a predetermined charge has accumulated on the condenser 38, the condenser will discharge through the tube 36, the amount of charge necessary to produce a break-down of the tube 36 being controlled by the bias applied to the control electrode of the tube.

The output of the relaxation oscillator is applied to the automatic frequency control system 12 which may be of a type well known in the art and which comprises a tube 62 which may, for example, be of the type generally known as a 956. Means are provided whereby appropriate voltages may be applied to the automatic frequency control system 12.

The automatic frequency control system is connected to the grid end of the tank coil of the variable oscillator 14 and the output from the variable oscillator 14, together with the output from a fixed oscillator 16, are applied to the detector and low-pass filter system 18. The variable oscillator, together with the fixed oscillator produce a beat frequency which cyclically varies between the limits of 20 cycles per second and 15,000 cycles per second. The period of each cycle is controlled by the freqency of the relaxation oscillator.

The cyclically varying logarithmic frequency variations from the detector and low-pass filter system 18 are applied to a power amplifier 20 from which the energy is derived which is applied to the particular apparatus under test.

The varying frequency oscillations as amplified by the power amplifier 20 are also applied to the voltage amplifier 22 which comprises a tube 64 which may, for example, be a triode of the type 6C5. A source of potential 66 is provided for maintaining the proper potential on the anode of the tube 64. Connected to the anode of the tube 64 is a switch arm 70 which may be selectively placed in contact with any of the switch terminals 72, 74, 76 or 78.

The switch termials 72, 74, 76 and 78 are connected to the frequency discriminating network 24 which comprises a resistance 80, a condenser 82 and a plurality of parallel resistances and condensers. The switch terminal 72 is connected to one terminal of the condenser 82 and one terminal of the resistance 80 is connected to ground. Between the other terminal 83 of the resistance 80 and the remaining terminal of the condenser 82 are connected the plurality of parallel resistances and condensers. The purpose of this network is to produce a voltage which varies logarithmically with respect to the applied frequency in order that the deflection of the cathode ray beam may vary in a logarithmic manner with respect to the frequency applied to the discriminating network and to the particular apparatus under test.

A plurality of condensers 84, 86 and 88 are also provided, one terminal of each of which is connected respectively to the switch contacts 74, 76 and 78. The other terminals of the condensers 84, 86 and 88 are connected together and are in turn connected to the end 83 of the resistance 80. The purpose of these condensers is to produce expansion with respect to frequency over a particular frequency range of the frequency applied to the apparatus under test, and the particular range expanded is determined by the size of the particular condenser which is connected in series with the resistance 80. By positioning the switch arm 70 on any one of the switch terminals 74, 76 or 78, a horizontal expansion of the characteristic curve of the particular apparatus under test may be accomplished the frequency range of the expanded portion being determined by the value of the resistance 80 and the particular condenser connected in series therewith.

A voltage is produced across the resistance 80 of the frequency discriminating network 24, and this voltage is applied to the rectifier and filter system 26 which comprises a duo-diode tube 90 which may be of the type 6H6 and a resistor 92 and a condenser 94. The tube 90 operates as a half-wave rectifier and the resistor and condenser combination 92, 94 operates as a filter.

The rectified and filtered output from the frequency discriminating network and amplifier system appears across the resistance 92 and this potential is applied to the control electrode of tube 96 which constitutes the direct current amplifier system 28. The tube 96 may, for instance, be of the type 6J7 which is a triple-grid amplifier. A source of current 98 is provided whereby the electrodes of the tube 96 may be maintained at proper operating potentials. The output from the amplifier 28 is applied to the deflecting plates 100 of the cathode ray tube 30 in order that the cathode ray beam may be deflected in a horizontal direction.

The output from the power amplifier 20, which is a cyclically varying oscillation, is applied to the particular apparatus under test which may be any electrical frequency responsive system or any mechanical frequency responsive system. Voltages which are derived from the particular apparatus under test in response to the applied frequencies are impressed upon the input terminals 31 of the system represented by the rectangle 32. This system includes a linear alternating current amplifier since the output from the apparatus under test will be alternating in nature and the output from the amplifier is rectified and filtered and finally amplified by a direct current amplifier. The direct current amplifier may be provided with means whereby the amplification may be linear or logarithmic as explained above.

The output from the direct current amplifier is applied to an additional amplifier stage which comprises a tube 102 which may be, for example, of the type 6J7. A source of positive potential 104 is provided for maintaining the anode and second control electrode of the tube at proper operating potentials and a small condenser 106 is connected between the anode of tube 102 and the first control electrode of that tube. This small condenser operates as a negative feed-back connection in order that any alternating current components which may appear in the output of the direct current amplifier may be eliminated so that the output of the tube 102 will contain no alternating current but only direct current or voltage which varies in intensity in accordance with the frequency response of the particular apparatus tested. The anode of tube 102 is connected to the vertical deflecting plates 110 of the cathode ray tube 30.

It may be seen, therefore, that the beam of the cathode ray tube 30 may be caused to be deflected horizontally as a function of the frequency applied to the particular apparatus under test and that the deflection may be either directly logarithmic or may have particular portions of the abscissae expanded with respect to frequency. Also, the beam may be deflected vertically in accordance with the frequency response of the particular apparatus under test.

The length of time required for the cathode ray beam to make one complete horizontal deflection is determined by the setting of the selector switch 42 which controls the amount of resistance which is included in series with the condenser 38, and at the end of the deflection time the cathode ray beam is returned for a subsequent deflection at the same instant that the condenser 38 is discharged through the tube 36. During this return it is desirable that vertical deflection of the cathode ray beam be prevented in order that the return trace of the beam will not cause a confusing curve to be superimposed upon the characteristic curve of the particular apparatus being tested.

In order to prevent the beam from being deflected vertically during its return period horizontally, a deflection control system is provided which comprises the tubes 108 and 109 which may be triodes of the type 6J5, for example. The anode of tube 38 of the relaxation oscillator 10 is connected to the control grid 112 of tube 108 and the anode 113 of this tube is connected to the control grid 114 of tube 109. The control grid 114 controls the amount of current which is permitted to pass to the anode 115 of tube 109 and this anode is connected to the connection between the anode of tube 102 and the vertical deflecting plates 110. It is desirable that the vertical beam deflection be controlled after the input from the apparatus under test has been amplified and rectified in order that the switch will not affect the time constant of the filters contained within the circuit represented by the rectangle 32.

The deflection control system for preventing vertical deflection of the cathode ray beam during horizontal return of the beam to an initial starting point operates in the following manner: During the charging period of the condenser 38 there is no potential applied to the anode of tube 36. Accordingly no potential is applied to the control grid 112 of the tube 108 and this electrode is at zero bias. The potential of the anode 113 during the time that the grid 112 is at zero potential is such that the control electrode 114 of tube 109 (which is connected to anode 113) will permit no current to flow to the anode 115 because of the presence of resistance 116. During this time the cathode ray beam is being deflected and is producing the characteristic curve, but when condenser 38 has been fully charged and begins to discharge through the tube 36, the control electrode 112 of tube 108 is made more negative with the result that current flow to the anode 113 is diminished or interrupted. Because of the decrease in the potential drop across the resistance 116 the potential of the control grid 114 of the tube 109 is permitted to increase positively, with the result that the conductivity of this triode and the accompanying anode current substantially short-circuits the output from the amplifier tube 102 with the further result that no potential is applied to the vertical deflecting plate 110. During the horizontal return of the cathode ray beam, therefore, the beam is prevented from being deflected vertically and accordingly the return trace of the cathode ray beam does not interfere with the characteristic curve already produced by the cathode ray beam.

In order that the position of the characteristic curve as produced on the screen of the cathode ray tube may be controlled, means are provided for biasing the horizontal and vertical deflecting plates and additional means are provided for positioning the zero setting of the system and the zero adjustment of the oscillator. When it is desired to perform this adjustment the switch 52 is closed, placing the small condenser 50 in parallel with the resistance 46. In order that the operation of this portion of the system may be entirely understood, values will be assigned to various of the elements which are effective in this system and it is to be understood that these values are merely taken by way of example, and that they may be changed to suit the particular requirements of the system. Assume that the value of the condenser 38 is 15 microfarads, the charging rate of which is determined by the size of the resistance 40 as stated above. Assume also that the value of the resistance 48 is 500 ohms, the value of resistance 46 is 50,000 ohms and the value of the condenser 50 is .001 microfarads. During the charging of the condenser 38 no current is present in the anode circuit of the tube 36 and accordingly no charge will be accumulated on the condenser 50. When the condenser 38 has acquired a predetermined charge the tube 36 will begin to conduct and accordingly begin to discharge the condenser 38. As soon as this operation begins current flows in the anode circuit of tube 36 with the result that the very small condenser 50 will be immediately charged and this charge will so reduce the potential existing at the anode of tube 36 that the tube will again become non-conductive. In view of the relative sizes of the condensers 38 and 50, very little of the accumulated charge on the condenser 38 will be removed to completely charge condenser 50. After the condenser 50 has been charged, and the tube 36 has again been blocked, the condenser 50 will discharge through the resistance 46, the rate of discharge being determined by the value of the resistance.

During the time when the small condenser 50 is discharging, the large condenser 38 will again be charged by an amount equal to the amount of the charge which was removed from it by the previous charging of condenser 50. As soon as the condenser 50 has discharged, the tube 36 will again become conductive, and the cycle will again be repeated. This cycle of operation may have a frequency of the order of several kilocycles, and so long as the switch 52 remains closed the condenser 38 cannot discharge with the result that the system is maintained at a standstill so that the usual zero adjustment to the oscillator may be easily accomplished. As soon as this adjustment has been made the switch 52 is then opened and the oscillator 10 is permitted to operate in the usual manner.

In order that a cathode ray beam may be developed in the cathode ray tube 30 appropriate potentials must of course be applied to the elements of the cathode ray gun structure in a manner well known in the art. In order that the position of the characteristic curve may be positioned vertically and horizontally on the fluorescent screen of the cathode ray tube means are provided whereby biasing potentials may be applied to the horizontal and vertical deflecting plates. A source of positive potential 120 is provided and a high resistance 122 is connected between this source of current and ground. The second anode of the cathode ray tube and one of each of the horizontal and vertical deflecting plates are connected together and are in turn connected to an adjustable point along the resistance 122. The operation of this portion of the system is believed to be clear to those skilled in the art and a further explanation is believed to be unnecessary.

In order that the beam may be focused, a resistance 123 is provided between a negative source of current 124 and ground. The first anode of the cathode ray tube is adjustably connected to this resistor and by moving the adjustable point along the resistor the potential applied to the first anode may be controlled which, of course, controls the focus of the beam in a manner well known in the art. It might be mentioned that the bias adjustment to the deflecting plates must be made first, since the second anode potential is controlled thereby, and then the focus adjustment may be made.

From the above it may be seen therefore that cyclically varying frequencies may be produced, the oscillations beginning at or about 15,000 cycles per second and decreasing to a value at or about 20 cycles per second. These frequencies are applied to a frequency discriminating network to produce horizontal deflection of a cathode ray beam, which in this particular instance is from left to right on the viewing screen of the cathode ray tube, the deflection being purely logarithmic or being expanded in certain portions of the frequency range at the choice of the operator. The cyclically varying frequencies are also applied to apparatus under test, the output from which is applied to the vertical deflecting plates of the cathode ray tube, with the result that a frequency response characteristic curve of the particular apparatus under test may be presented on the viewing screen of the cathode ray tube.

Figure 3:
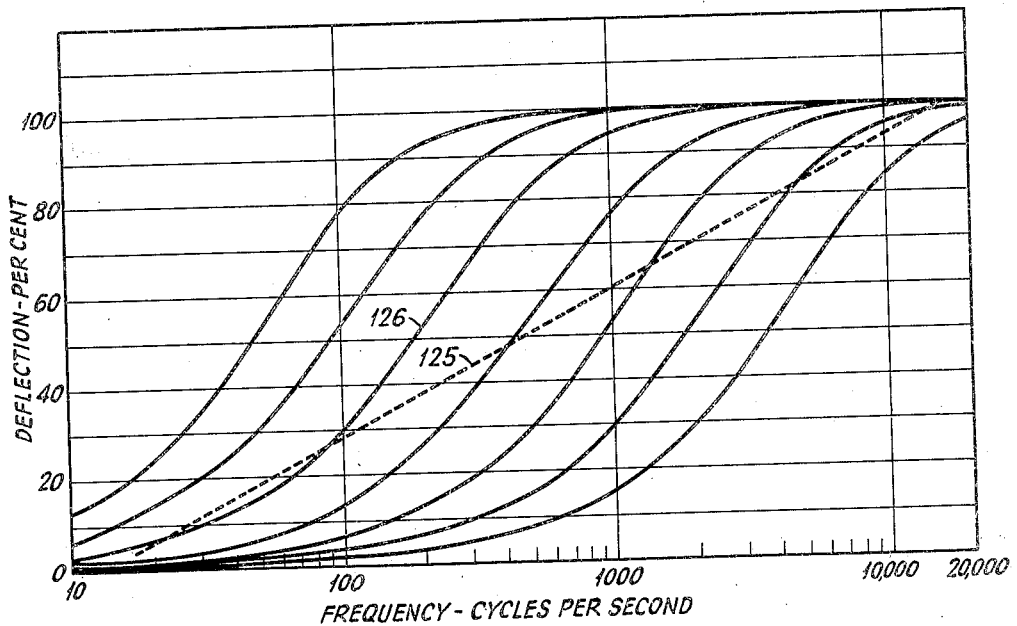
Figure 3 shows a plurality of curves indicating the percent of horizontal deflection of the cathode ray beam as a function of the applied frequency, the curves representing both the logarithmic response and the expanded response.

In Figure 3 is shown a plurality of curves representing the horizontal deflection as the ordinate and as a function of the frequency in cycles per second which are applied to the frequency responsive network 24. The broken curve 125 represents the deflection of the cathode ray beam when the beam is deflected horizontally logarithmically and corresponds to the operation of the frequency responsive network 24 when the switch arm 70 is placed on the switch contact 72. The remaining curves represent the expansion with respect to frequency which is possible over particular frequency ranges and correspond to the positioning of the switch arm 70 on the one or another of the switch contacts 74, 76 or 78. Although only three switch contacts are shown whereby expansion within particular frequency ranges may be accomplished it is of course understood that a greater number of contacts may be used with a corresponding number of condensers connected thereto in order that a greater number of expansible frequency ranges may be selected.

If, for instance, a condenser and resistance of such magnitude are used as to produce a frequency band expansion corresponding to that indicated by curve 126, then the response of the particular apparatus being tested will be shown in considerable detail within the limits of approximately 40 cycles and 700 cycles per second. If it is desired, however, to accurately determine the frequency response of the particular apparatus under test, then only the straight line portion of the particular curve should be used and in that event, the curve represented at 126 would show accurately the frequency response of the apparatus between approximately 100 and 500 cycles per second. This range of frequencies would occupy over half of the horizontal width of the produced image of the cathode ray tube. By selecting different condenser and resistance combinations various other bands within the frequency range of the apparatus may be expanded in order that the response characteristics within the particular selected band may be more accurately determined. Ordinarily, however, one curve of frequency response is made using straight logarithmic deflection without any expansion by placing the switch arm 70 on contact 72 and then a series of other curves are produced by expanding particular frequency ranges over the entire frequency range of the system.

Figure 4:
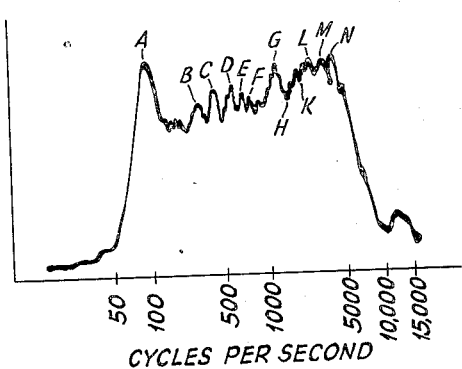
Figures 4, 5, 6 and 7 represent typical curves which may be presented on the viewing screen of the cathode ray tube and illustrate the effect of the expansion of particular portions of the produced curve.

Figures 4, 5, 6 and 7 show, by way of example, the results which may be produced by the present invention and the curves shown in these figures were made from actual photographs taken of the curve as it appeared on the fluorescent screen of a cathode ray tube. The curves shown indicate the frequency response of a 12 inch speaker with a baffle 2 ft. square and open on three sides and the back. The microphone for picking up the sound produced by the speaker was positioned at a distance of 6 inches from the speaker. The apparatus was not positioned in an acoustically designed room, and the curves are not for the purpose of indicating the true performance and fidelity of the speaker under ideal conditions, but are for indicating the results which may be obtained through the use of the present invention. A horizontal sweep of twenty seconds time duration was used for each curve but more detail could be had by increasing the time to about one minute. In Figure 4 the switch arm 70 was placed on contact 72 and the horizontal deflection of the cathode ray beam was accordingly logarithmic in nature. It may be seen from Figure 4 that the speaker was relatively insensitive to 50 cycles per second but that the sensitivity raised very rapidly and in fact was somewhat peaked at around 100 cycles. The sensitivity then reduced somewhat and continued with varying degrees of sensitivity to a frequency of about 5000 cycles at which time the response diminished rapidly with a slight peak between 10,000 and 15,000.

Figure 5:
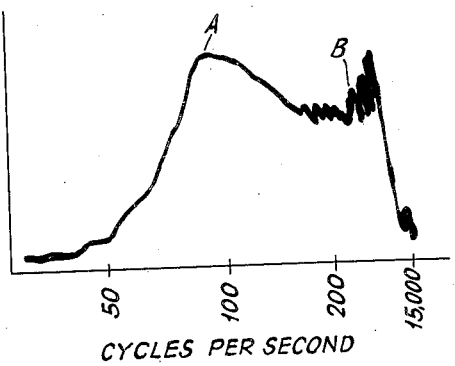

In order that the response of the speaker over particular frequency bands within the range of the test apparatus could be more accurately ascertained, portions of the frequency band were expanded. In Figure 5 is shown an expansion with respect to frequency in the range between 50 and 200 cycles per second. The peak A which occurs at about 100 cycles in Figure 4 may again be seen in Figure 5 and the small ripple at about 200 cycles in Figure 4 is much more clearly seen in Figure 5.

Figure 6:
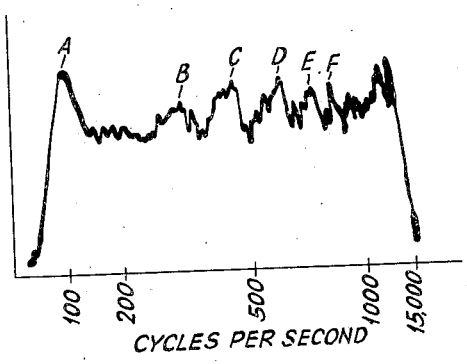

Figure 6 shows an expansion in the frequency range between 100 and 1000 cycles per second. Here, peaks marked B through F in Figure 4 may be more clearly seen and are shown in more detail in Figure 6.

Figure 7:
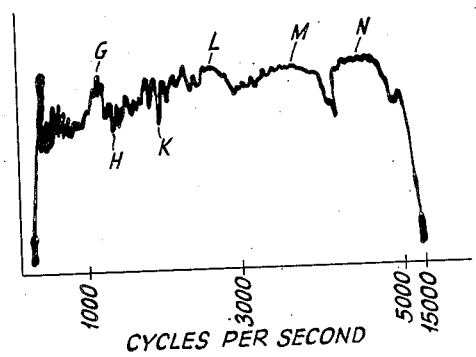

Figure 7 shows a test of the same speaker wherein the frequency range between 1000 and 5000 was expanded and the points of the curve marked G, H, K, L, M and N in Figure 4 are clearly shown in detail in Figure 7. Attention is particularly directed to the small loops M and N in Figure 4, which, when expanded, occupy considerable lateral space in Figure 7. It may be seen that the loop M is in fact made up of a plurality of superimposed small variations in frequency response which do not appear in Figure 4.

While the curves shown in Figure 4 through 7 were made from a loud speaker as the apparatus tested, it is to be understood that any other electrical apparatus which is designed to respond to different frequencies in any particular manner may be tested. Furthermore, the apparatus may also be used to test mechanical devices, the device being subjected to vibrations in accordance with the varying frequencies and the response of the apparatus being translated into potential variations by means of a piezo-electric crystal or some other element which will produce electrical variations from changes in mechanical stress.

It is also to be understood that although specific tubes are designated as applicable in the present invention, other tubes may well be used provided the function of the tubes will correspond to that required by the particular portion of the circuit wherein the tube is used.

It is also to be understood that the curve is best seen on the cathode ray tube if the tube is provided with a screen having a long persistency although this is not entirely necessary, particularly when the characteristic curve is to be photographed.

Other alterations and modifications may be made in the present invention without departing from the spirit and scope thereof, and it is desired that any and all such modifications be considered as being within the purview of the present invention except as limited by the hereinafter appended claims.

I claim as my invention:

1. A system for determining the frequency response characteristics of a device comprising means for producing a variable frequency source of energy of constant amplitude, a frequency discriminating network, means for applying the said energy to said network to produce a voltage which is a function of the frequency applied thereto, said network including means for expanding the voltage-frequency response thereof over a predetermined frequency range, a cathode ray tube comprising an electron gun structure and horizontal and vertical deflecting plates, means for applying the produced voltage to the horizontal deflecting plates, means for applying the said energy to the device the frequency response of which is to be determined, means for producing a voltage in accordance with the response of the device, and means for applying the said voltage to the vertical deflecting plates.

2. A system for determining the frequency response characteristics of a device comprising means for producing a variable frequency source of energy of constant amplitude, a frequency discriminating network, means for applying the said energy to said network to produce a voltage which is a function of the frequency applied thereto, said network including means for expanding the voltage-frequency response thereof over a predetermined frequency range, means for producing a stream of electrons, horizontal and vertical deflecting means for the stream of electrons, means for applying the produced voltage to the horizontal deflecting means, means for applying the said energy to the device the frequency response of which is to be determined, means for producing a voltage in accordance with the response of the device, and means for applying the said voltage to the vertical deflecting means.

3. A system for determining the frequency response characteristics of a device comprising means for producing a variable frequency source of energy of constant amplitude, a frequency discriminating network, means for applying the said energy to said network to produce a voltage which is a function of the frequency applied thereto, said network including means whereby the voltage-frequency response is accentuated over a predetermined portion of the entire frequency range, means for generating a beam of electrons, means for deflecting the beam of electrons in at least two planes, means for applying the produced voltage to the means for deflecting the beam in one plane, means for applying the said energy to the device the frequency response of which is to be determined, means for producing a voltage in accordance with the response of the device, and means for applying the said voltage to the means for deflecting the beam in another plane.

4. A system for determining the frequency response characteristics of a device comprising a relaxation oscillation circuit, means connected to said circuit for producing a recurrent variable frequency source of energy of constant amplitude, a frequency discriminating network, means for applying the said energy to said network to produce a recurrent voltage which is a function of the frequency applied thereto, a cathode ray tube comprising an electron gun structure and horizontal and vertical deflecting plates, means for applying the produced voltage to the horizontal deflecting plates, means for applying the said energy to the device the frequency response of which is to be determined, means for producing a voltage in accordance with the response of the device, means for applying the said voltage to the vertical deflecting plates, and means connected to said relaxation oscillation circuit for rendering said last named means ineffective during predetermined portions of the recurrent cycle.

5. A system for determining the frequency response characteristics of a device comprising means for producing a recurrent variable frequency source of energy of constant amplitude, a frequency discriminating network, means for applying the said energy to said network to produce a recurrent voltage which is the function of the frequency applied thereto, a cathode ray tube comprising an electron gun structure and horizontal and vertical deflecting means, means for applying the produced voltage to the horizontal deflecting means, means for applying the said energy to the device the frequency response of which is to be determined, means for producing a voltage in accordance with the response of the device, means for applying the said voltage to the vertical deflecting means, and means for rendering said last named means ineffective during a predetermined portion of the recurrent cycle.

6. A system for determining the frequency response characteristics of a device comprising means for producing a recurrent variable frequency source of energy of constant amplitude, a frequency discriminating network, means for applying the said energy to said network to produce a recurrent voltage which is the function of the frequency applied thereto, means for generating a beam of electrons, means for deflecting the beam of electrons in at least two planes, means for applying the recurrent voltage to the means for deflecting the beam in one plane, means for applying the said energy to the device the frequency response characteristics of which is to be determined, means for producing a voltage in accordance with the response of the device, means for applying the said voltage to the means for deflecting the beam in another plane, and means for rendering said voltage ineffective during at least a portion of the recurrent cycle.

7. A system for determining the frequency response characteristics of a device comprising means for producing a recurrent variable frequency source of energy of constant amplitude, a frequency discriminating network, means for applying the said energy to said network to produce a recurrent voltage which is the function of the frequency applied thereto, said network including means for expanding the voltage frequency response thereof over a predetermined frequency range, means for generating a beam of electrons, means for deflecting the beam of electrons in at least two planes, means for applying the recurrent voltage to the means for deflecting the beam in one plane, means for applying the said energy to the device the frequency response characteristics of which is to be determined, means for producing a voltage in accordance with the response of the device, means for applying the said voltage to the means for deflecting the beam in another plane, and means for rendering said voltage ineffective during at least a portion of the recurrent cycle.

8. A system for determining the frequency response characteristics of a device comprising a relaxation oscillation circuit, means connected to said circuit for producing a recurrent variable frequency source of energy of constant amplitude, a frequency discriminating network, means for applying the said energy to said network to produce a recurrent voltage which is a function of the frequency applied thereto, said network including means whereby the voltage-frequency response is accentuated over a predetermined portion of the entire frequency range, a cathode ray tube comprising an electron gun structure and horizontal and vertical deflecting plates, means for applying the produced voltage to the horizontal deflecting plates, means for applying the said energy to the device the frequency response of which is to be determined, means for producing a voltage in accordance with the response of the device, means for applying the said voltage to the vertical deflecting plates, and means connected to said relaxation oscillation circuit for rendering said last named means ineffeccuit for rendering said last named means ineffective during predetermined portions of the recurrent cycle, said relaxation oscillation circuit including means whereby the oscillations may be stopped at a predetermined instant in the cycle to permit adjustment of the variable frequency producing means.

9. The method of determining the frequency response characteristics of a device which comprises the steps of producing a variable frequency source of energy of constant amplitude, producing a varying voltage as a function of the variable frequency, producing a beam of electrons, causing the beam to be deflected in one plane by the varying voltage produced, applying the variable frequency to the device to be tested to produce a second voltage in accordance with the frequency response of the device causing the beam to be deflected in another plane by the second voltage, and preventing deflection of the beam in the last named plane during predetermined portions of the cycle of operation.

10. The method of determining the frequency response characteristics of a device which comprises the steps of producing a variable frequency source of energy of constant amplitude, producing a varying voltage as a function of the variable frequency, expanding the voltage-frequency response, producing a beam of electrons, causing the beam to be deflected in one plane by the varying voltage produced, applying the variable frequency to the device to be tested to produce a second voltage in accordance with the frequency response of the device, and causing the beam to be deflected in another plane by the second voltage so produced.

11. A system for determining the frequency response characteristics of a device comprising means for generating a recurrent variable frequency source of energy of constant amplitude, a frequency discriminating network, means for applying said energy to said network to produce a recurrent voltage of variable intensity depending upon the frequency of the source of energy, a cathode ray tube comprising an electron gun structure and horizontal and vertical beam deflecting means, means for applying the produced voltage to the horizontal deflecting means, means for applying the said energy to the device the frequency response of which is to be determined, means for producing a voltage in accordance with the response of the device, means for applying the said voltage to the vertical deflecting means, and means for rendering said last-named voltage ineffective for beam deflection during transition periods between recurrent cycles of operation.

JESSE B. SHERMAN.